UNITED STATES PATENT OFFICE.

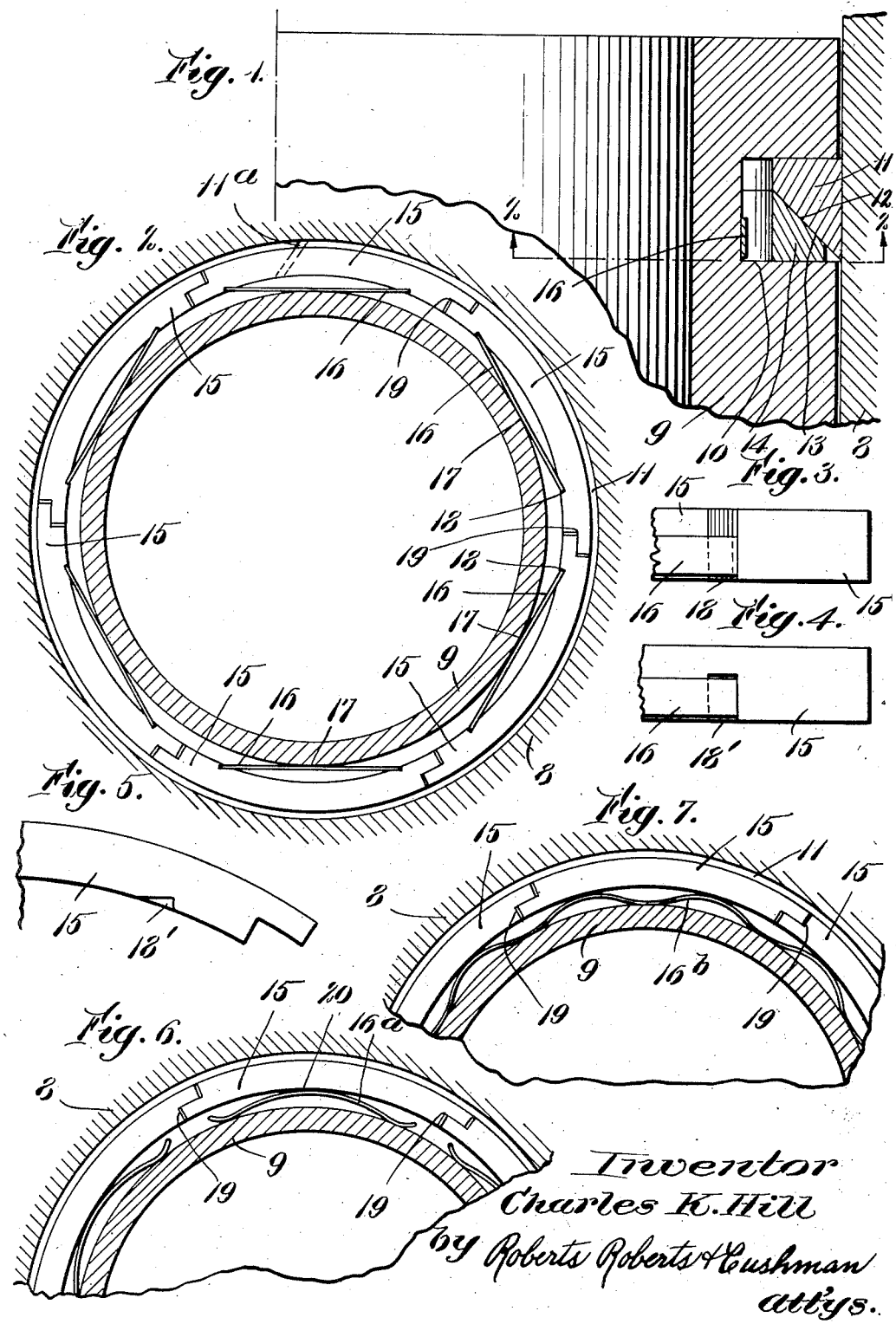

CHARLES K. HILL, OF CLEVELAND, OHIO, ASSIGNOR TO PRESSURE PROOF PISTON RING COMPANY, OF BOSTON, MASSACHUSETTS, A CORPORATION OF MASSACHUSETTS.

PISTON-RING.

1,359,596.  Specification of Letters Patent.  Patented Nov. 23, 1920.

Application filed December 8, 1919. Serial No. 343,161.

*To all whom it may concern:*

Be it known that I, CHARLES K. HILL, a citizen of the United States, and resident of Cleveland, in the county of Cuyahoga and State of Ohio, have invented new and useful Improvements in Piston-Rings, of which the following is a specification.

This invention relates to piston packings particularly adapted for use with internal combustion engines. While especially suited for use in such engines the invention is, nevertheless, such as to be broadly useful in all engines operating by means of gaseous or fluid pressure against a piston.
An efficient piston packing for internal combustion engines must admit of a comparatively large variation in the clearance between the piston and cylinder. These engines operate under a relatively high temperature, and although the cylinder is cooled either by air blast or water circulation, the piston is not so cooled. This necessitates a rather large clearance between the piston and cylinder when the engine is cool in order that there may be no binding when the engine is warmed up.

The ordinary method of packing at present in use consists in split rings sprung into grooves, the rings being normally of greater diameter than the internal diameter of the cylinder. The resiliency of the ring is relied upon to keep it in contact with the inner wall of the cylinder. Such a ring, however, does not when compressed or expanded retain its circular shape, but tends to become distorted, causing unequal bearing, the loss of compression and unequal wear on the cylinder.

I am aware that it has been heretofore proposed to form the packing of two rings, an outer packing ring normally the same size as the internal diameter of the cylinder and a one piece, split, spring, follower ring inside the packing ring to force it into contact with the cylinder. I am also aware that it has been proposed to have the spring follower ring bear against both a beveled edge of the packing ring and the flat side of the groove in the piston, in order to force the bearing ring both radially against the cylinder and axially against the other side of the groove and thus to prevent leakage between the packing ring and both the cylinder and the side of the groove. This construction has the advantage of permitting the groove to be made wider than the rings, which facilitates assembly and removal of the packing. Such construction, however, does not wholly obviate the unequal expansion of the split ring.

It is an object of the present invention to retain all the advantages accruing from having the packing made of a plurality of parts and further to eliminate or minimize distortion of the packing. The outer packing ring is uniformly pressed outward against the cylinder throughout its circumference and there is consequently no loss of pressure and no unequal wear on the cylinder.

I have illustrated an embodiment of my invention in several different forms in the accompanying drawings, in which—

Figure 1 is a cross sectional view partly in perspective showing a portion of the piston and cylinder together with the ring construction;

Fig. 2 is a plan view, partly in cross section, on the line 2—2 of Fig. 1, on a slightly reduced scale;

Fig. 3 is a fragmentary view of a portion of one of the follower elements together with its spring;

Fig. 4 is a view similar to Fig. 3 but of a modified form;

Fig. 5 is a bottom view of part of one of the followers shown in Fig. 4;

Fig. 6 is a fragmentary view similar to Fig. 2, but showing a modified form of spring; and

Fig. 7 is also a fragmentary view similar to Fig. 2, but showing a different modification of the spring structure.

In the several figures of the drawing, 8 designates the cylinder wall, and 9 the piston having the groove 10 cut therein. In this groove is the split bearing or contact ring 11, having the beveled lower surface 12 and being split at 11ª. Bearing against this beveled surface 12 is the upper beveled surface 13 of the sectional follower ring 14. The follower ring 14 is composed of a plurality of similar sections 15, six such sections being shown in Fig. 2.

In the form shown in Fig. 2, each section 15 is pressed outward by a separate flat steel spring 16. The springs 16 bear against the bottom of the groove in the piston at their center points 17, and their ends fit into slots 18 in the sections 15, which slots are substantially equidistant from the centers of the sections.

The ends of adjacent sections 15 are fitted one to another by overlapping joints 19. While this particular type of joint is not essential it is highly desirable that a portion of the contact of the joint be on a line substantially concentric with the circumference of the piston or tangent to such a line. This preserves connection between the several sections when the follower is expanded and thus aids in securing continuity and uniformity of pressure.

In the form shown in Fig. 3, the slots 18 are shown extending fully from top to bottom of the sections 15. This form is preferable from a manufacturing standpoint, and the spring 16 may be kept from riding out of the slot by a punch prick above it.

In Fig. 4 the slot is shown at 18' in an alternative form extending only partly up the member 15. Fig. 5 shows this form of slot as seen from below.

While Fig. 2 shows the springs as straight, it is not to be understood that this indicates that this is their normal position and that they are not then exerting any outward pressure on the follower elements. Their normal position when unstressed may be either flat, concave, or slightly convex considered in relation to the piston. In the structure shown in Fig. 2, they would normally be concave, and hence when straight as shown in the figure they would be exerting an outward pressure due to their tendency to resume their normal concave condition.

The modification shown in Fig. 6 shows a convex spring 16ª with small reversed curves at each end. This results in one convex surface bearing against each section 15 and two such surfaces bearing against the base of the groove on the piston. This structure eliminates the slot 18 or 18' in the element 15.

The modification shown in Fig. 7 discloses the use of a continuous sinuous spring 16ᵇ instead of the separate springs 16 or 16ª. As shown, the spring bears against each section 15 at two points but it is obvious that this may be varied by increasing or decreasing the number of convolutions in the spring.

The form of sectional follower ring, each section of which is individually pressed outward, gives a substantially uniform pressure on all parts of the bearing ring 11 and insures a uniform expansion of that ring, and hence a uniform bearing against the cylinder wall. This obviates the uneven bearing and consequent unequal wear with its resultant loss of compression as found in the structures heretofore used.

It is pointed out that this function of giving a uniform bearing applies not only to the bearing against the cylinder wall, but, in the form shown, also against the wall of the groove.

In former devices which had the combined radial and endwise thrust, but with an integral follower ring, a warping of either the bearing ring or follower ring would cause an unequal bearing against the side of the groove with consequent loss of pressure.

In the present device the sectional follower ring cannot warp, and on account of the inherent flexibility of its sectional structure it will tend to take up any warping of the bearing ring and cause uniform contact with the side of the groove.

I claim:—

In combination, a piston having a rectangular annular groove therein, and a packing in said groove comprising a continuous resilient packing ring divided at a single point, the ring having concentric inner and outer surfaces, one lateral surface perpendicular thereto and adapted to contact with a lateral wall of the groove, and the other lateral surface being oblique and forming an acute angle with the outer surface, a sectional follower ring formed of sections having concentric outer and inner surfaces, one lateral surface being oblique and adapted to contact with the oblique surface of the packing ring and the other lateral surface adapted to contact with the opposite lateral wall of the groove, a spring of less width than the follower member bearing against each follower section and adapted to expand the follower in a radial direction, a slot passing part way across each follower at the bearing points and adapted to receive the spring ends and to retain them between the slot end and the side of the groove to prevent lateral play and maintain the spring thrust at the predetermined point.

Signed by me at Cleveland, Ohio, this 29th day of November, 1919.

CHAS. K. HILL.